United States Patent
Vajravel et al.

(10) Patent No.: US 11,799,717 B1
(45) Date of Patent: Oct. 24, 2023

(54) COORDINATED SECURE WORKSPACE SERVICING

(71) Applicant: Dell Products L.P., Round Rock, TX (US)

(72) Inventors: Gokul Thiruchengode Vajravel, Bangalore (IN); Vivekanandh Narayanasamy Rajagopalan, Bangalore (IN); Srinivasa Ragavan Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/051,644

(22) Filed: Nov. 1, 2022

(51) Int. Cl.
 *G06F 15/173* (2006.01)
 *H04L 41/08* (2022.01)

(52) U.S. Cl.
 CPC ........ *H04L 41/08* (2013.01); *G06F 2209/505* (2013.01)

(58) Field of Classification Search
 CPC ........................... H04L 41/08; G06F 2209/505
 See application file for complete search history.

(56) References Cited

U.S. PATENT DOCUMENTS

| | | | | |
|---|---|---|---|---|
| 3,854,014 A | * | 12/1974 | Akin | H04Q 3/00 379/215.01 |
| 2003/0125072 A1 | * | 7/2003 | Dent | H04W 76/40 455/445 |
| 2007/0100981 A1 | * | 5/2007 | Adamczyk | H04L 69/32 709/223 |
| 2012/0293605 A1 | * | 11/2012 | Seferian | H04L 65/1069 348/E7.083 |
| 2016/0180259 A1 | * | 6/2016 | Marianko | H04L 65/1069 705/5 |
| 2023/0230045 A1 | * | 7/2023 | Berndtsson | G06Q 10/1095 705/7.19 |

FOREIGN PATENT DOCUMENTS

| | | | | |
|---|---|---|---|---|
| CN | 101258482 A | * | 9/2008 | ............ G06F 16/81 |
| CN | 112367434 A | * | 2/2021 | ............ G06Q 10/02 |
| CN | 113377665 A | * | 9/2021 | |
| JP | H05344225 A | * | 12/1993 | |

* cited by examiner

*Primary Examiner* — Richard G Keehn
(74) *Attorney, Agent, or Firm* — KIRTON MCCONKIE; Brian Tucker

(57) ABSTRACT

Secure workspace servicing can be coordinated. A host agent on a user computing device can include a servicing manager plugin that is configured to interface with a workspace agent running in one or more secure workspaces deployed on the user computing device. The workspace agent can periodically report a status of the respective secure workspace to the servicing manager plugin. The servicing manager plugin can use the reported status to categorize each secure workspace in a critical workspace cluster or a non-critical workspace cluster. When the host agent received a servicing policy, the servicing manager plugin can coordinate the servicing of the secure workspaces using the critical and non-critical workspace clusters.

20 Claims, 10 Drawing Sheets

COORDINATED SECURE WORKSPACE SERVICING

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine or a software-based container. An application hosted in a secure workspace, which can be considered a containerized application, will be isolated from resources in the external environment and from other applications or services hosted external to the secure workspace, including native applications and applications hosted in other secure workspaces.

It is oftentimes necessary to service secure workspaces. For example, an update, rollback, or security patch may need to be made to an application hosted within a secure workspace or to the secure workspace itself. Typically, an administrator may configure such servicing of secure workspaces and deploy the servicing to many user computing devices on which the secure workspaces may be used. For example, if an update needs to be made to Zoom and Zoom is hosted in a secure workspace on an enterprise's user computing devices, an administrator may push out the update to each user computing device causing the update to be made upon receipt. If a user happens to be using Zoom when the update is received, the update may cause the secure workspace in which Zoom is hosted to be shutdown. Similarly, if a secure workspace used to host another collaboration application needs to be patched, the administrator may push out the patch causing the secure workspace to be shut down even if the collaboration application is being used. Oftentimes, an administrator will initiate servicing on multiple different secure workspaces at the same time which can cause significant impacts on productivity and result in data loss.

BRIEF SUMMARY

The present invention extends to systems, methods and computer program products for coordinating secure workspace servicing. A host agent on a user computing device can include a servicing manager plugin that is configured to interface with a workspace agent running in one or more secure workspaces deployed on the user computing device. The workspace agent can periodically report a status of the respective secure workspace to the servicing manager plugin. The servicing manager plugin can use the reported status to categorize each secure workspace in a critical workspace cluster or a non-critical workspace cluster. When the host agent received a servicing policy, the servicing manager plugin can coordinate the servicing of the secure workspaces using the critical and non-critical workspace clusters.

In some embodiments, the present invention may be implemented as a method or computer storage media storing computer executable instructions for coordinating secure workspace servicing. A workspace agent can be executed in secure workspaces deployed on a user computing device. The workspace agent may be configured to determine status of the respective secure workspace. A servicing manager plugin of a host agent executing on the user computing device external to the secure workspaces can receive the status of each of the secure workspaces. The servicing manager plugin can categorize the secure workspaces in a critical workspace cluster or a non-critical workspace cluster based on the respective status. A servicing policy that defines servicing for the secure workspaces can be received. The servicing for the secure workspaces can be coordinated using the critical and non-critical workspace clusters.

In some embodiments, the present invention may be implemented as a system that includes a management server and a plurality of user computing device. Each user computing device may include a host agent having a servicing manager plugin. Each user computing device may be configured to deploy a plurality of secure workspaces. Each secure workspace may include a workspace agent. The servicing manager plugin may be configured to perform a method for coordinating servicing of the secure workspaces. The servicing manager plugin may receive status of the respective secure workspaces from the workspace agents in the secure workspaces. The servicing manager plugin may categorize the secure workspaces in a critical workspace cluster and a non-critical workspace cluster based on the status. In response to receiving a servicing policy, the servicing manager plugin may coordinate servicing of the secure workspaces defined in the servicing policy using the critical workspace cluster and the non-critical workspace cluster.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
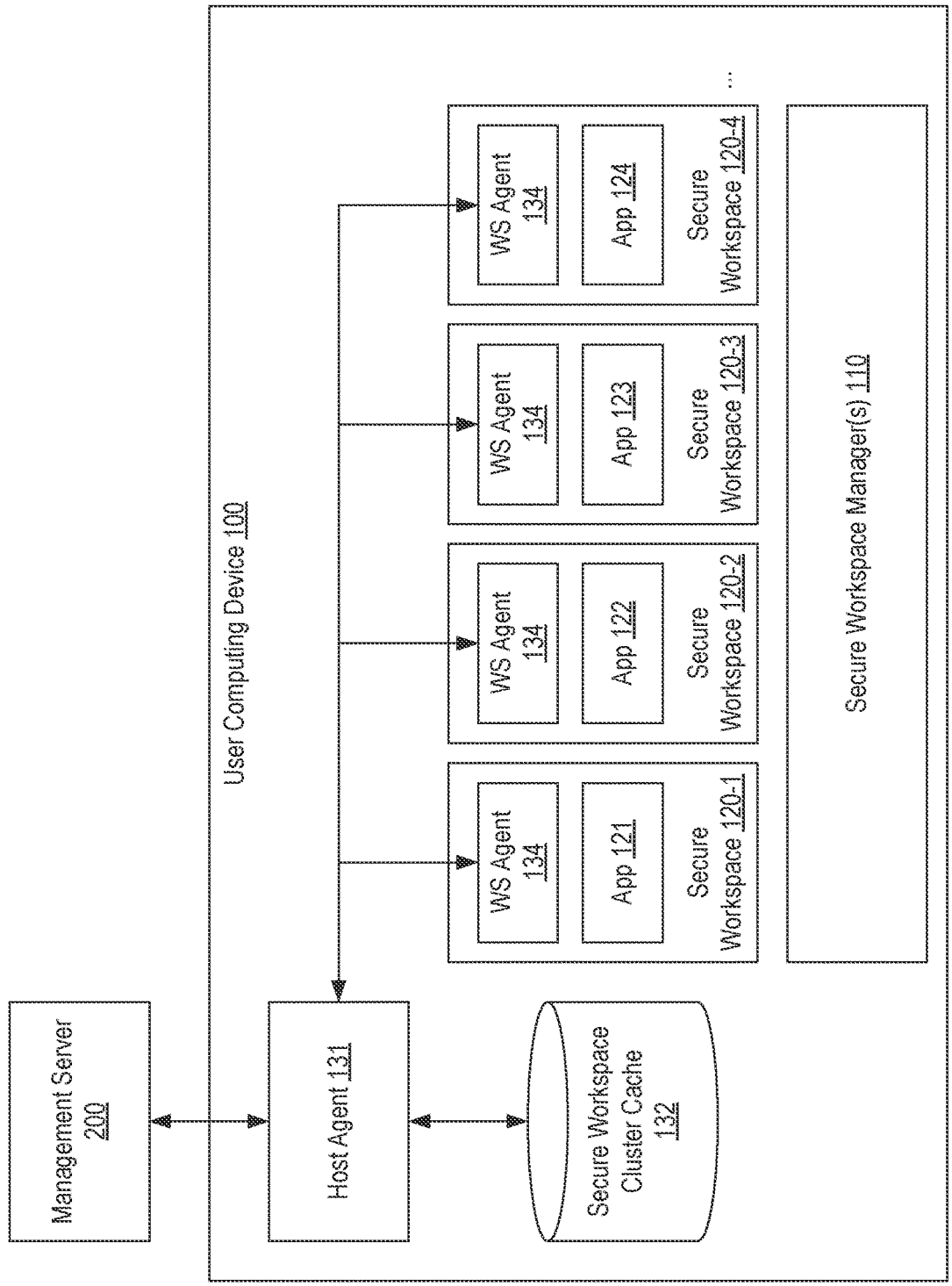
FIG. 1 provides an example of a computing environment in which embodiments of the present invention may be implemented.

FIG. 1 provides an example of a computing environment in which one or more embodiments of the present invention may be implemented. This computing environment includes a user computing device 100 and a management server 200 which is used to manage user computing device 100. Although only a single user computing device 100 is shown, management server 200 would typically be used to manage a large number of user computing devices, any or all of which could be configured in the same manner as user computing device 100 to thereby allow coordinated secure workspace servicing in accordance with embodiments of the present invention.

User computing device 100 is shown as having one or more secure workspace managers 110. A secure workspace manager is intended to represent the components on user computing device 100 that allow secure workspaces to be deployed. For example, a secure workspace manager may be a hypervisor (e.g., Hyper-V) when virtual machines are used to implement secure workspaces, a container daemon when containers (e.g., Docker containers) are used to implement secure workspaces, a sandbox manager when sandboxes (e.g., Sandboxie isolated environments) are used to implement secure workspaces, a Webapp manager when a browser sandbox is used to implement secure workspaces, etc. In the depicted example, it is assumed that four secure workspaces 120-1 through 120-4 are deployed on user computing device 100. However, there could be any number and/or type of secure workspaces at any given time. These secure workspaces are represented as hosting applications 121, 122, 123, and 124 respectively. Notably, a secure workspace could include more than one application.

User computing device 100 is also shown as having a host agent 131. Host agent 131 can be configured to implement management services on user computing device 100 including the deployment and management of secure workspaces on user computing device 100. For example, management server 200 may interface with host agent 131 to provide secure workspaces (or at least information for creating secure workspaces), and host agent 131 may interface with secure workspace manager(s) 110 to create and manage the secure workspaces.

Each secure workspace can include a workspace agent 134 that is configured to interface with host agent 131 to implement coordinated secure workspace servicing in accordance with embodiments of the present invention. Host agent 131 may maintain a secure workspace cluster cache 132 for storing information about the secure workspaces to be used in determining when to service the secure workspaces.

FIGS. 2A-2I provide an example of how coordinated secure workspace servicing can be implemented in accordance with one or more embodiments of the present invention. This example is based on the example computing environment of FIG. 1.

Figure 2A:
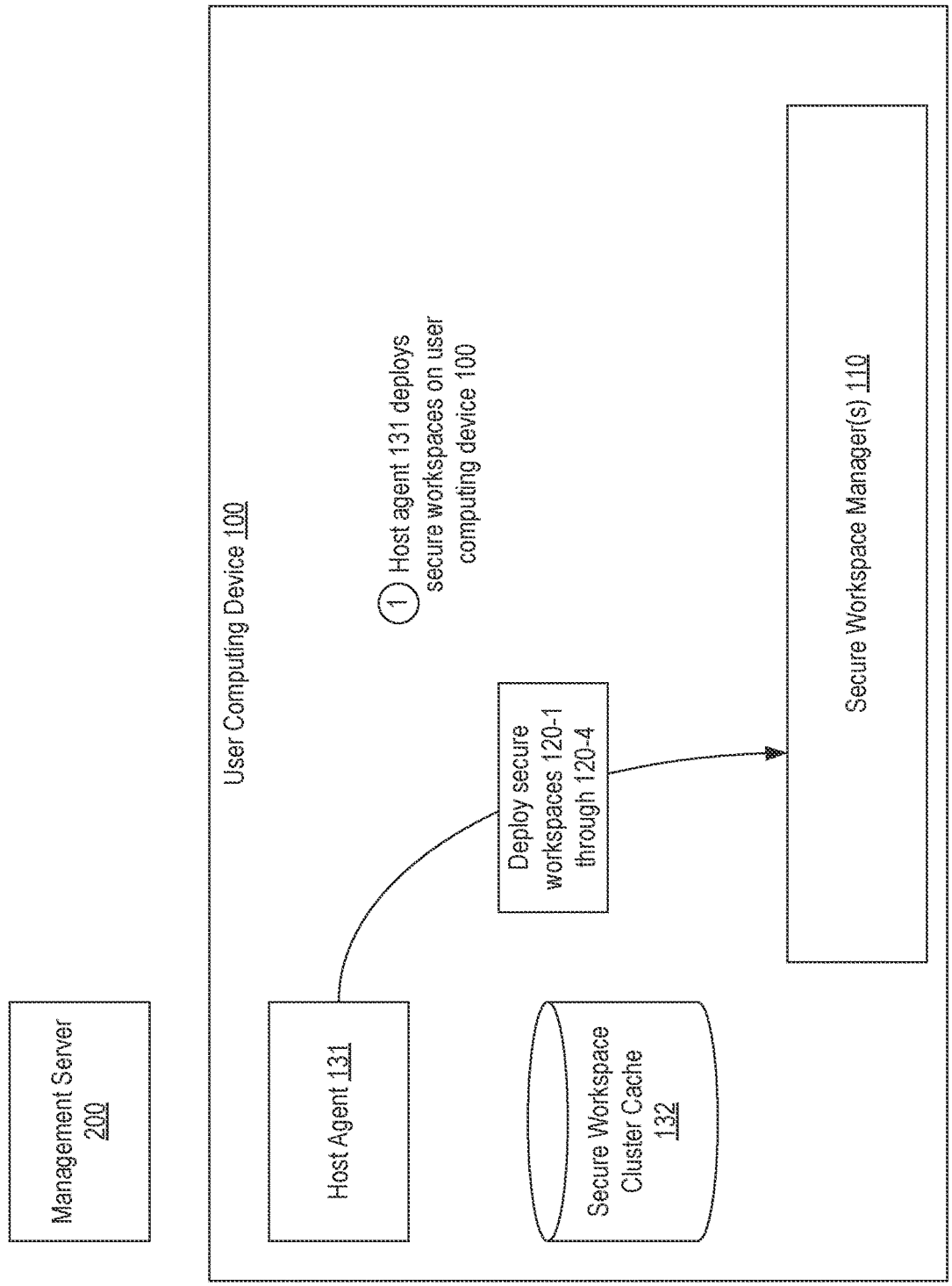
FIGS. 2A-2I provide an example of how coordinated secure workspace servicing can be implemented in accordance with one or more embodiments of the present invention.

Turning to FIG. 2A, it is assumed that no secure workspaces have been deployed on user computing device 100 (e.g., user computing device 100 has just been booted) but host agent 131 has been loaded. In step 1, host agent 131 can cause secure workspaces 120-1 through 120-4 to be deployed on user computing device 100. For example, host agent 131 could interface with management server 200 to determine which secure workspaces should be deployed and to obtain any information/data necessary to deploy them and could then interface with secure workspace manager(s) 110 to initiate the deployment of the secure workspaces (e.g., to create a virtual machine using an image defining the secure workspace, to start a Docker container with layers defining the secure workspace, etc.).

Figure 2B:
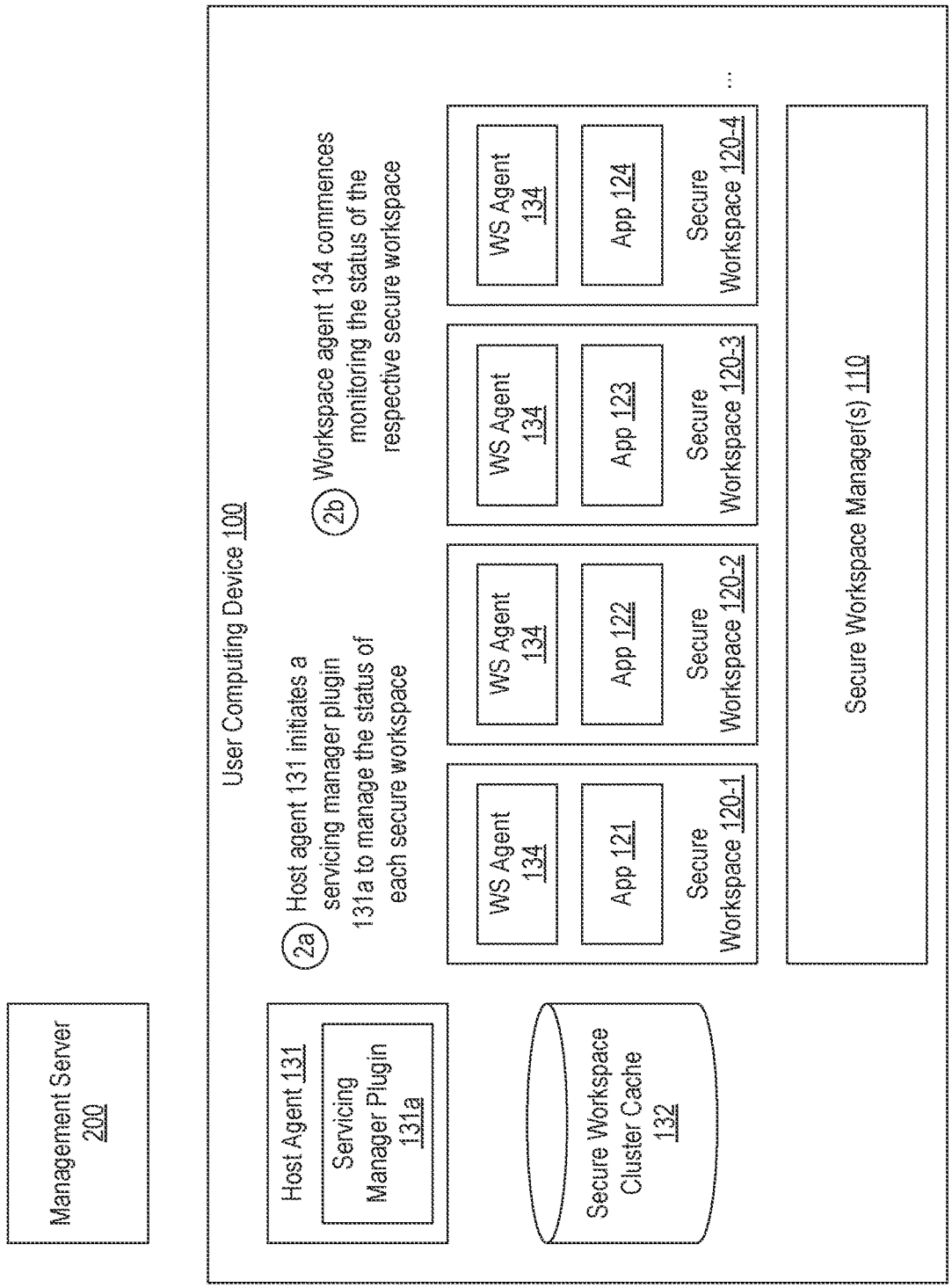

Turning to FIG. 2B, it is now assumed that secure workspaces 120-1 through 120-4 have been deployed and that workspace agent 134 is running within each secure workspace. In step 2a, which could be performed at any time including prior to the deployment of the secure workspaces, host agent 131 initiates a servicing manager plugin 131a to manage the status of secure workspaces deployed on user computing device 100. In step 2b, the instance of workspace agent 134 in each secure workspace can commence monitoring the status of the respective secure workspace. This monitoring can include determining whether any application hosted within the secure workspace is active. For example, if application 121 is Zoom or another collaboration application, workspace agent 134 could determine if application 121 is currently joined to a meeting. As another example, if application 121 is Word or another productivity application, workspace agent 134 could determine if the user is actively using application 121 (e.g., by determining whether application 121 has focus or is receiving keyboard input). In short, step 2b can entail a variety of actions that workspace agent 134 may take to determine whether the user is currently using the secure workspace.

Figure 2C:
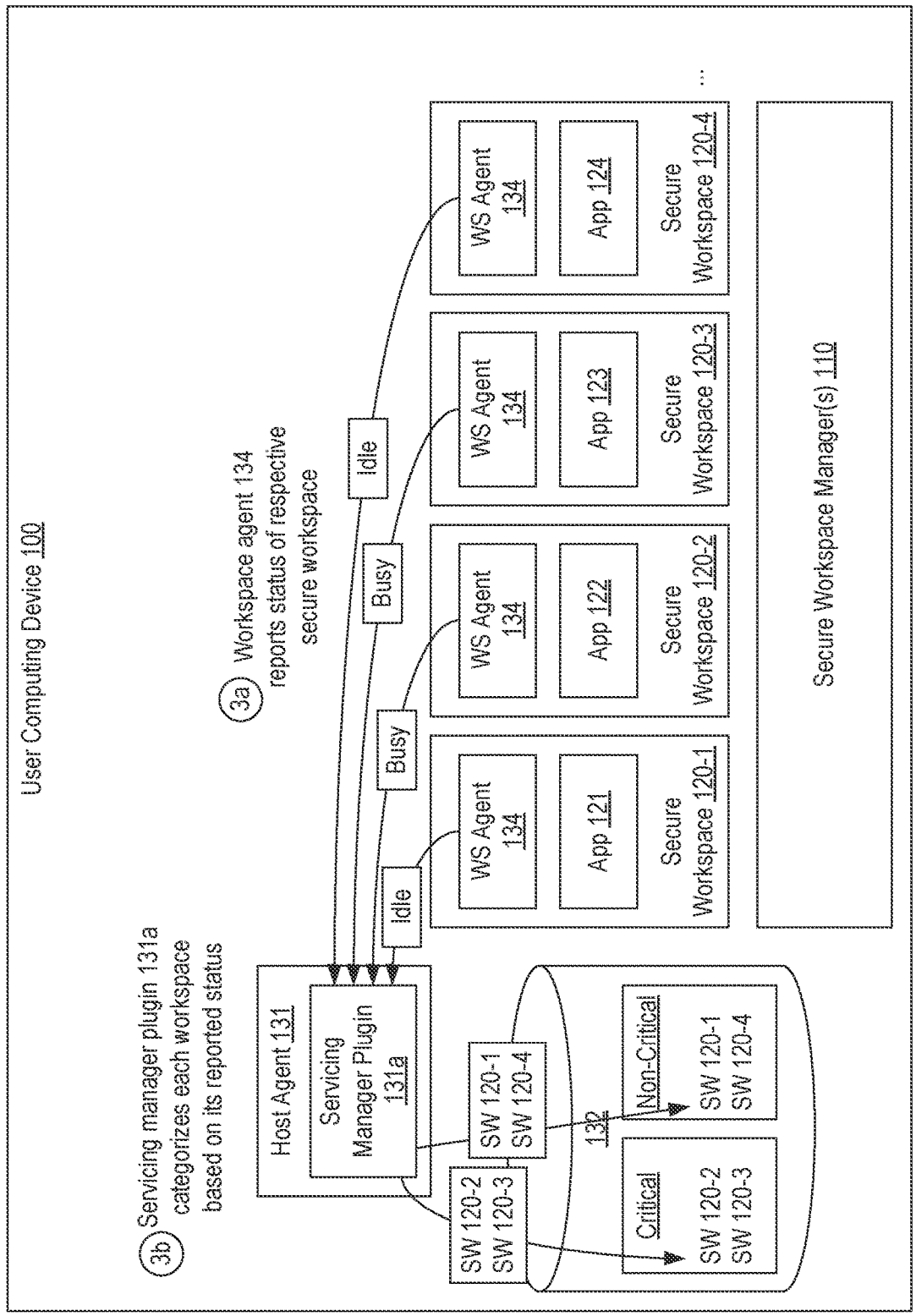

Turning to FIG. 2C, in step 3a, each instance of workspace agent 134 can report the status of the respective secure workspace to servicing manager plugin 131a. For example, this status could be reported as idle or busy. Workspace agent 134 could be configured to report this status periodically or whenever the status changes. For example, if workspace agent 134 determines that the user is using a collaboration application with the secure workspace to present during a meeting, workspace agent 134 could report a status of busy for that secure workspace. Subsequently, workspace agent 134 could determine that the meeting has ended and could report a status of idle.

In step 3b, servicing manager plugin 131a can categorize each workspace based on its reported status. For example, in FIG. 2C, the instances of workspace agent 134 in secure workspaces 120-1 and 120-4 have reported a status of idle and the instances of workspace agent 134 in secure workspaces 120-2 and 120-3 have reported a status of busy. Therefore, servicing manager plugin 131a has stored an identification of secure workspaces 120-1 and 120-4 in a non-critical workspace cluster in secure workspace cluster cache 132 and has stored an identifier of secure workspaces 120-2 and 120-3 in a critical workspace cluster in secure workspace cluster cache 132. Accordingly, secure workspace cluster cache 132 can define the current status of each secure workspace as being either critical or non-critical. Servicing manager plugin 131a can move each secure workspace between the critical workspace cluster and non-critical workspace cluster as appropriate in response to receiving status updates from workspace agents 134.

Figure 2D:
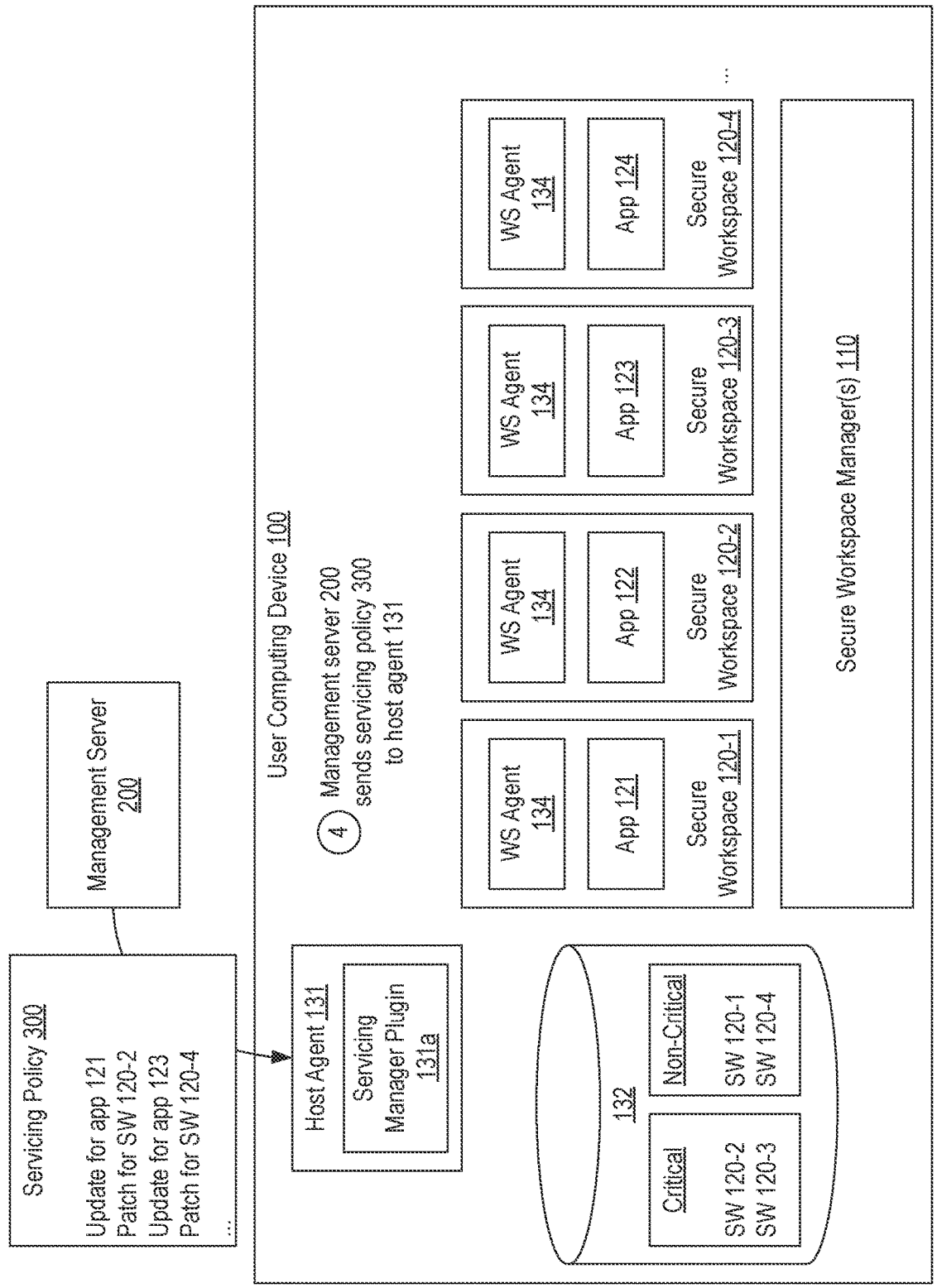
Figure 2E:
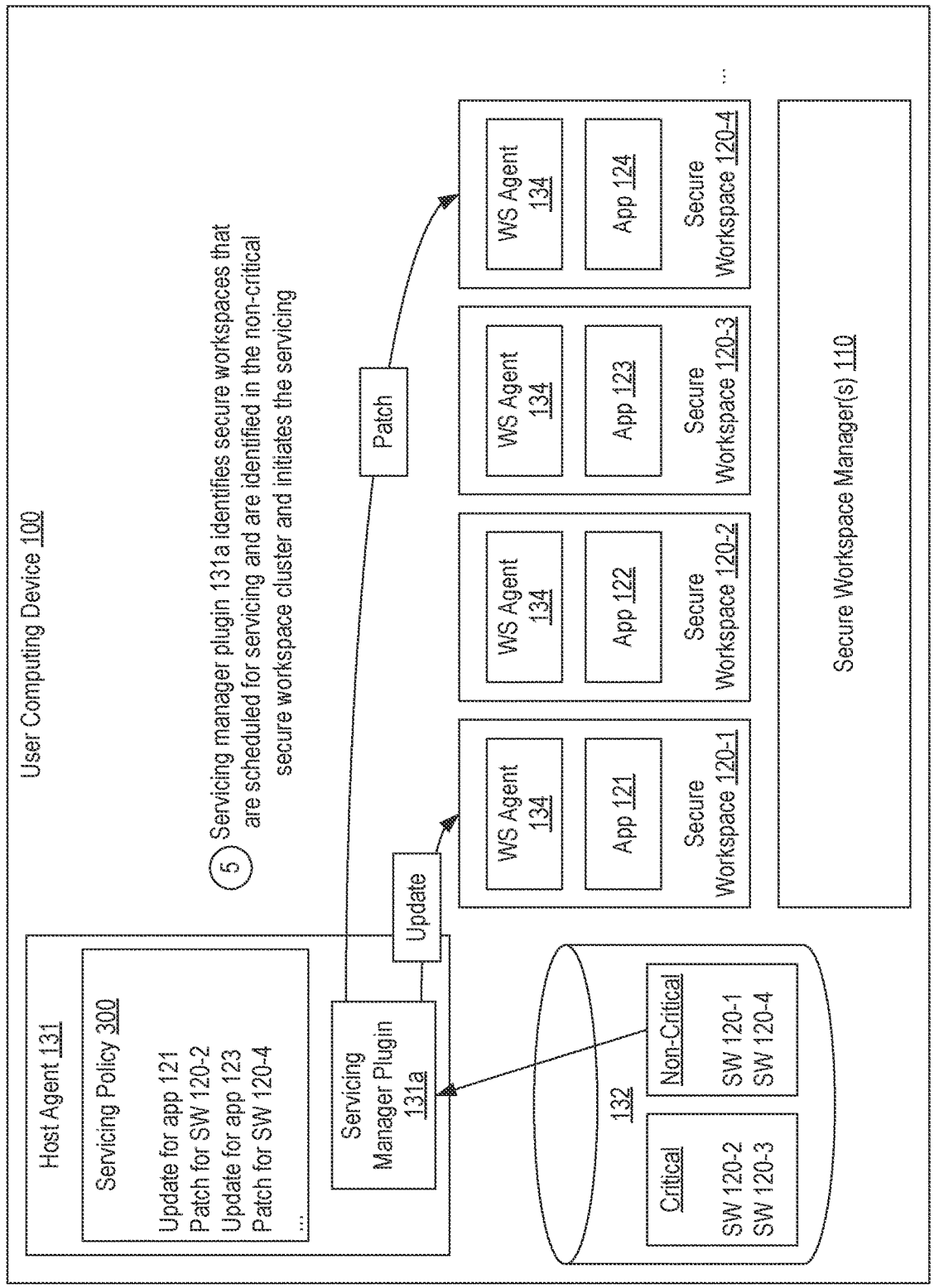

Turning to FIG. 2D, in step 4, it is assumed that management server 200 sends a servicing policy 300 to host agent 131. Servicing policy 300 can define servicing that is to be performed on secure workspaces on user computing device. For example, servicing policy 300 identifies an update for application 121, a patch for secure workspace 120-2, an update for application 123, and a patch for secure workspace 120-4. As suggested above, servicing policy 300 could be pushed out in response to an administrator identifying/providing the servicing that is to be performed to the various secure workspaces.

Turning to FIG. 2D, in step 5, which can be performed in response to receiving servicing policy 300, servicing manager plugin 131a can access the non-critical workspace cluster to determine if any of the secure workspaces to be serviced have a non-critical status. For any secure workspace to be serviced that is also identified in the non-critical workspace cluster, servicing manager plugin 131a can initiate the servicing. For example, in FIG. 2D, servicing manager plugin 131a is shown as deploying the update for application 121 to secure workspace 120-1 and deploying the patch to secure workspace 120-4. This servicing can then be performed which may lead to the containerized application or the secure workspace itself being restarted. In contrast, for any secure workspace that is to be serviced and that is identified in the critical workspace cluster, servicing manager plugin 131a may forego initiating the servicing. For example, servicing manager plugin 131a does not initiate the patching of secure workspace 120-2 or the update for application 123 in response to receiving servicing policy 300 because secure workspaces 120-2 and 120-3 are identified in the critical workspace cluster.

Figure 2F:
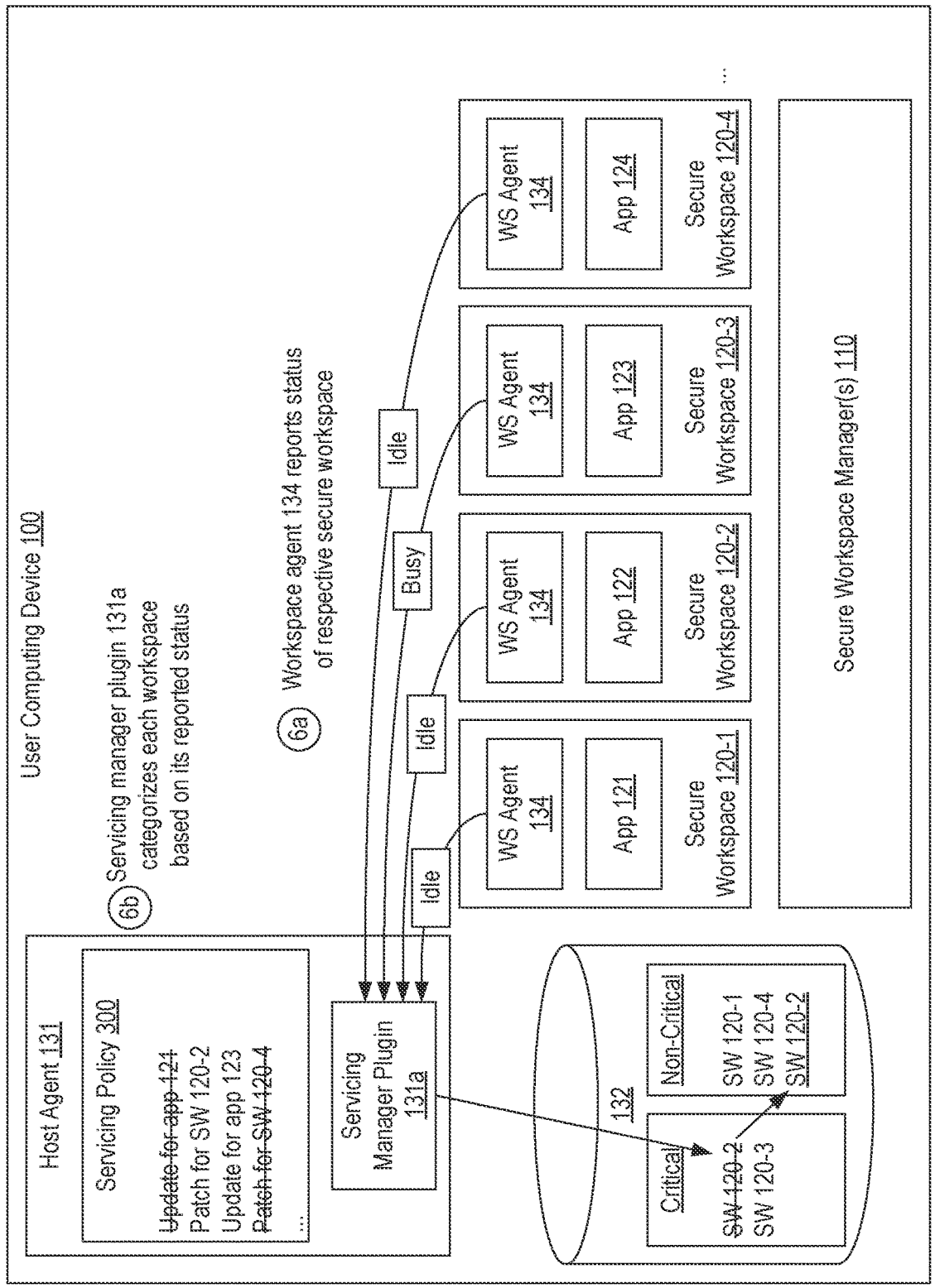

Turning to FIG. 2F, it is now assumed that the servicing of secure workspaces 120-1 and 120-4 has been completed and that, as represented as step 6a, the instances of workspace agent 134 are continuing to report the status of the respective secure workspace. At this point, it is also assumed that the instances of workspace agent 134 in secure workspaces 120-1, 120-2, and 120-4 are reporting an idle status while the instance of workspace agent 134 in secure workspace 120-3 is still reporting a busy status. Therefore, in step 6b, servicing manager plugin 131a can recategorize secure workspace 120-2 into the non-critical workspace cluster while retaining secure workspace 120-3 in the critical workspace cluster.

Figure 2G:
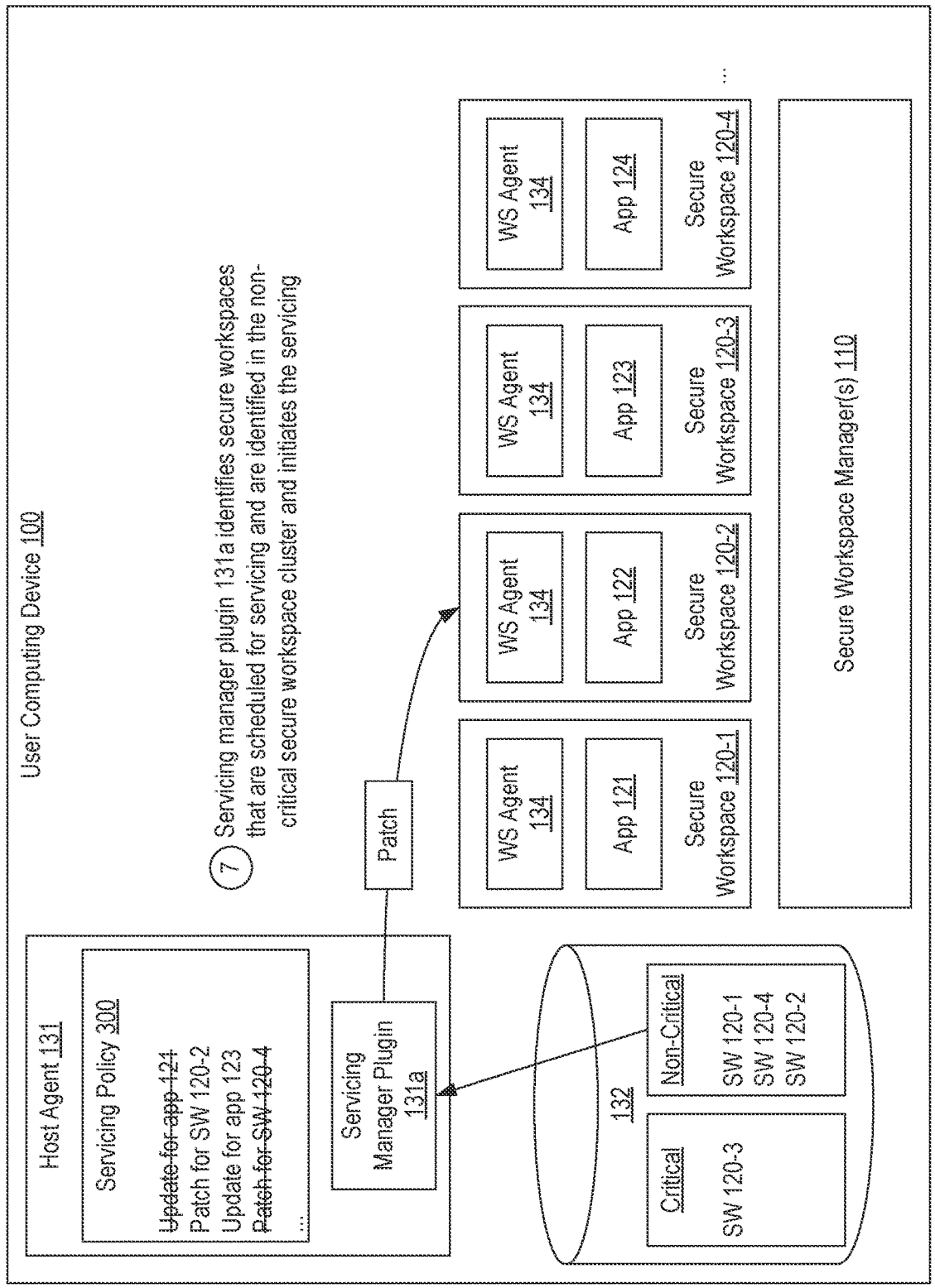

Turning to FIG. 2G, in step 7, servicing manager plugin 131a can determine that servicing policy 300 defines servicing to be performed on secure workspace 120-2 which is now categorized in the non-critical workspace cluster. Therefore, servicing manager plugin 131a can initiate the servicing of secure workspace 120-2 by deploying the patch. Accordingly, the servicing of secure workspace 120-2 is initiated in response to determining that secure workspace 120-2 has been recategorized from the critical workspace cluster to the non-critical workspace cluster. In comparison, servicing manager plugin 131a can still forego the servicing of secure workspace 120-3 because secure workspace 120-3 remains in the critical workspace cluster.

Figure 2H:
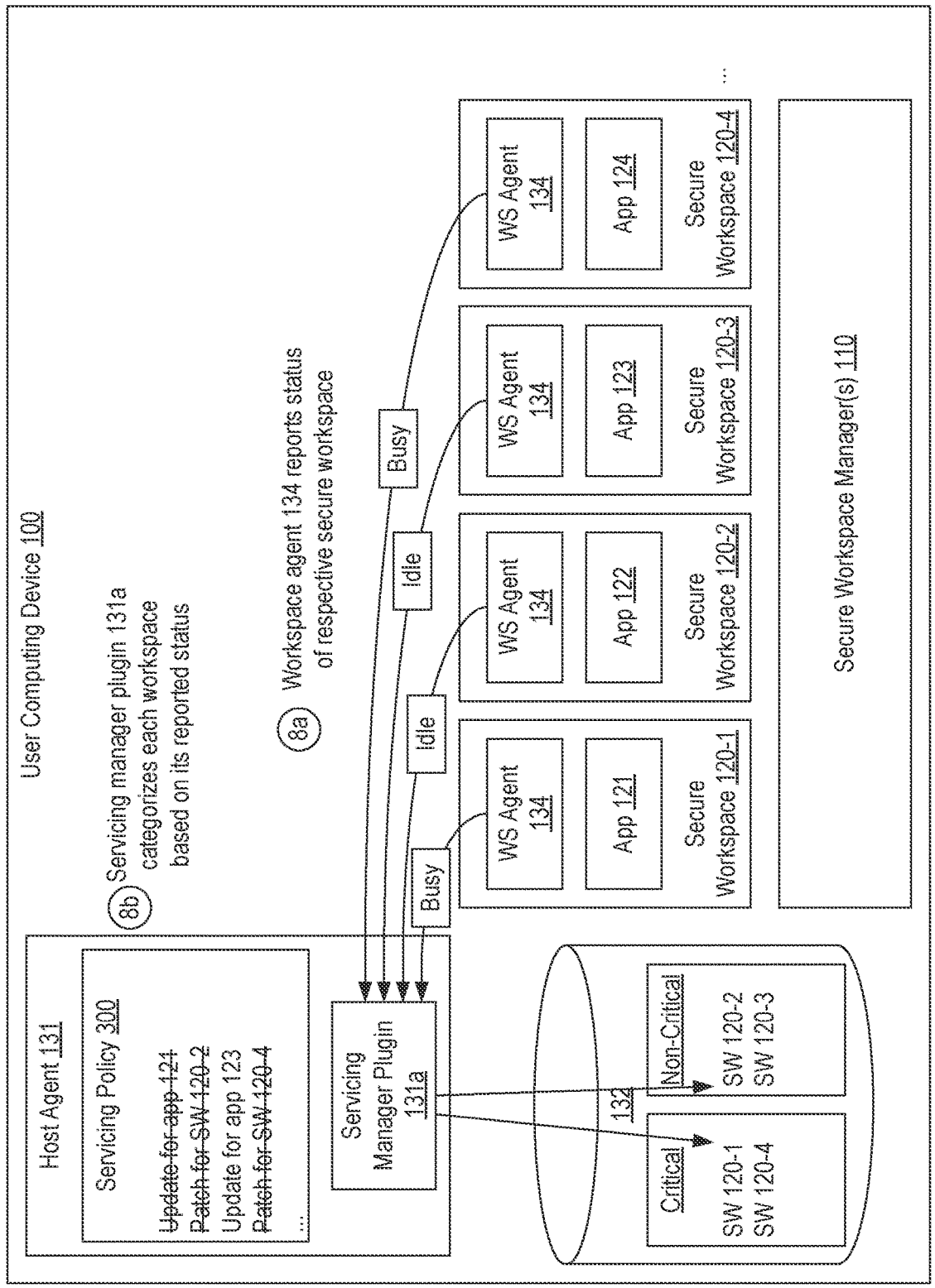

Turning to FIG. 2H, it is now assumed that the servicing of secure workspace 120-3 has been completed and that, as represented as step 8a, the instances of workspace agent 134 are continuing to report the status of the respective secure workspace. At this point, it is also assumed that the instances of workspace agent 134 in secure workspaces 120-2 and 120-3 are reporting an idle status while the instances of workspace agent 134 in secure workspaces 120-1 and 120-4 are reporting a busy status. Therefore, in step 6b, servicing manager plugin 131a can recategorize secure workspace 120-3 into the non-critical workspace cluster and recategorize secure workspaces 120-1 and 120-4 into the critical workspace cluster while retaining secure workspace 120-2 in the non-critical workspace cluster.

Figure 2I:
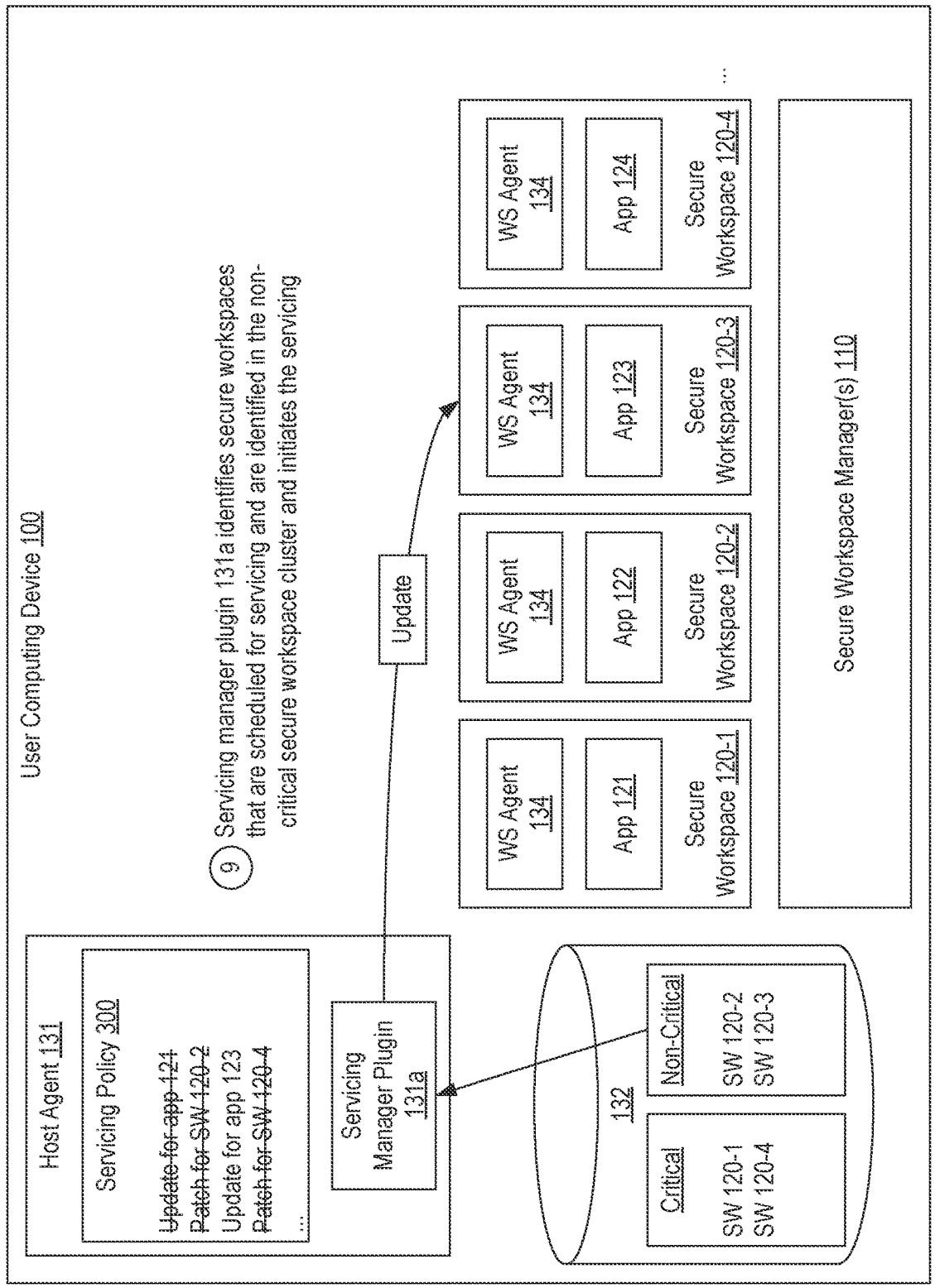

Turning to FIG. 2I, in step 9, servicing manager plugin 131a can determine that servicing policy 300 defines servicing to be performed on secure workspace 120-3 which is now categorized in the non-critical workspace cluster. Therefore, servicing manager plugin 131a can initiate the servicing of secure workspace 120-3 by deploying the update to application 123. Accordingly, the servicing of secure workspace 120-3 is initiated in response to determining that secure workspace 120-3 has been recategorized from the critical workspace cluster to the non-critical workspace cluster. At this point, all the servicing defined in servicing policy 300 has been performed, and host agent 131 may report the completion of the servicing back to management server 200. Servicing manager plugin 131a can continue to monitor the status of each secure workspace and categorize each secure workspace accordingly until again receiving a servicing policy. In this way, servicing manager plugin 131a can ensure that the servicing of the secure workspaces is carried out in a coordinated manner that minimizes the impact on user productivity and the risk of data loss.

In some embodiments, this same process can be used to coordinate taking snapshots of secure workspaces. For example, servicing manager plugin 131a can forego initiating a snap of a secure workspace that is categorized in the critical workspace cluster.

In summary, embodiments of the present invention allow the servicing of secure workspaces to be coordinated to avoid impacting the user's productivity or experience when using secure workspaces to host applications. This coordination of the servicing can ensure that the secure workspaces are serviced in an order that prevents the servicing from interfering with the user's use of a secure workspace.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for coordinating secure workspace servicing, the method comprising:
executing a workspace agent in secure workspaces deployed on a user computing device, the workspace agent being configured to determine status of the respective secure workspace;
receiving, at a servicing manager plugin of a host agent executing on the user computing device external to the secure workspaces, the status of each of the secure workspaces;
categorizing the secure workspaces in a critical workspace cluster or a non-critical workspace cluster based on the respective status;
receiving a servicing policy that defines servicing for the secure workspaces; and
coordinating the servicing for the secure workspaces using the critical and non-critical workspace clusters.

2. The method of claim 1, wherein determining the status of the respective secure workspace comprises determining whether an application hosted in the respective secure workspace is active.

3. The method of claim 2, wherein the application is a collaboration application and determining whether the application hosted in the respective secure workspace is active comprises determining whether the collaboration application is joined to a meeting.

4. The method of claim 2, wherein determining whether the application hosted in the respective secure workspace is active comprises determining whether the application is receiving input from a user of the user computing device.

5. The method of claim 1, wherein the status represents either a busy status or an idle status and wherein categorizing the secure workspaces in the critical workspace cluster or the non-critical workspace cluster based on the respective status comprises categorizing a secure workspace with a busy status in the critical workspace cluster and categorizing a secure workspace with an idle status in the non-critical workspace cluster.

6. The method of claim 1, wherein coordinating the servicing for the secure workspaces using the critical and non-critical workspace clusters comprises initiating the servicing for a secure workspace categorized in the non-critical workspace cluster and foregoing initiating servicing for a secure workspace categorized in the critical workspace cluster.

7. The method of claim 6, wherein a first secure workspace is categorized in the critical workspace cluster when the servicing policy is received, the method further comprising:
determining that the first secure workspace has been recategorized from the critical workspace cluster to the non-critical workspace cluster; and
in response, initiating servicing of the first secure workspace.

8. The method of claim 7, wherein the first secure workspace is recategorized from the critical workspace cluster to the non-critical workspace cluster in response to the workspace agent in the first secure workspace providing status of the first secure workspace.

9. The method of claim 1, wherein the servicing comprises one or more of:
updating an application hosted in the respective secure workspace;
patching the respective secure workspace;
rolling back the respective secure workspace; or
taking a snapshot of the respective secure workspace.

10. One or more computer storage media storing computer executable instructions which when executed implement a method for coordinating secure workspace servicing, the method comprising:
executing a workspace agent in secure workspaces deployed on a user computing device, the workspace agent being configured to determine status of the respective secure workspace;
receiving, at a servicing manager plugin of a host agent executing on the user computing device external to the secure workspaces, the status of each of the secure workspaces;
categorizing the secure workspaces in a critical workspace cluster or a non-critical workspace cluster based on the respective status;
receiving a servicing policy that defines servicing for the secure workspaces; and
coordinating the servicing for the secure workspaces using the critical and non-critical workspace clusters.

11. The computer storage media of claim 10, wherein determining the status of the respective secure workspace comprises determining whether an application hosted in the respective secure workspace is active.

12. The computer storage media of claim 11, wherein the application is a collaboration application and determining whether the application hosted in the respective secure workspace is active comprises determining whether the collaboration application is joined to a meeting.

13. The computer storage media of claim 11, wherein determining whether the application hosted in the respective secure workspace is active comprises determining whether the application is receiving input from a user of the user computing device.

14. The computer storage media of claim 10, wherein the status represents either a busy status or an idle status and wherein categorizing the secure workspaces in the critical workspace cluster or the non-critical workspace cluster based on the respective status comprises categorizing a secure workspace with a busy status in the critical workspace cluster and categorizing a secure workspace with an idle status in the non-critical workspace cluster.

15. The computer storage media of claim 10, wherein coordinating the servicing for the secure workspaces using the critical and non-critical workspace clusters comprises initiating the servicing for a secure workspace categorized in the non-critical workspace cluster and foregoing initiating servicing for a secure workspace categorized in the critical workspace cluster.

16. The computer storage media of claim 15, wherein a first secure workspace is categorized in the critical workspace cluster when the servicing policy is received, the method further comprising:
determining that the first secure workspace has been recategorized from the critical workspace cluster to the non-critical workspace cluster; and
in response, initiating servicing of the first secure workspace.

17. The computer storage media of claim 16, wherein the first secure workspace is recategorized from the critical workspace cluster to the non-critical workspace cluster in response to the workspace agent in the first secure workspace providing status of the first secure workspace.

18. The computer storage media of claim 10, wherein the servicing comprises one or more of:

updating an application hosted in the respective secure workspace;

patching the respective secure workspace;

rolling back the respective secure workspace; or taking a snapshot of the respective secure workspace.

19. A system comprising:

a management server; and a plurality of user computing devices, each user computing device including a host agent having a servicing manager plugin, each user computing device being configured to deploy a plurality of secure workspaces, each secure workspace including a workspace agent;

wherein the servicing manager plugin is configured to perform a method for coordinating servicing of the secure workspaces, the method comprising:

receiving, from the workspace agents in the secure workspaces, status of the respective secure workspaces;

categorizing the secure workspaces in a critical workspace cluster and a non-critical workspace cluster based on the status; and in response to receiving a servicing policy, coordinating servicing of the secure workspaces defined in the servicing policy using the critical workspace cluster and the non-critical workspace cluster.

20. The system of claim 19, wherein coordinating servicing of the secure workspaces defined in the servicing policy using the critical workspace cluster and the non-critical workspace cluster comprises initiating the servicing for a secure workspace categorized in the non-critical workspace cluster and foregoing initiating servicing for a secure workspace categorized in the critical workspace cluster.

* * * * *